United States Patent
Cho (10) Patent No.: US 10,384,538 B2
(45) Date of Patent: Aug. 20, 2019

(54) METHOD FOR CONTROLLING E-4WD HYBRID VEHICLE

(71) Applicants: HYUNDAI MOTOR COMPANY, Seoul (KR); KIA MOTORS CORPORATION, Seoul (KR)

(72) Inventor: Jinkuk Cho, Goyang-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 15/824,790

(22) Filed: Nov. 28, 2017

(65) Prior Publication Data

US 2019/0077258 A1    Mar. 14, 2019

(30) Foreign Application Priority Data

Sep. 8, 2017    (KR) .................. 10-2017-0115184

(51) Int. Cl.
| | |
|---|---|
| *B60W 20/19* | (2016.01) |
| *B60K 23/08* | (2006.01) |
| *B60K 17/346* | (2006.01) |
| *B60W 30/18* | (2012.01) |
| *B60W 20/13* | (2016.01) |

(52) U.S. Cl.
CPC ...... *B60K 23/0808* (2013.01); *B60K 17/3462* (2013.01); *B60W 20/13* (2016.01); *B60W 20/19* (2016.01); *B60W 30/18172* (2013.01); *B60W 2520/105* (2013.01); *B60W 2520/403* (2013.01); *B60W 2720/403* (2013.01)

(58) Field of Classification Search
CPC ...... B60W 20/11; B60W 20/13; B60W 20/19; B60W 2520/105; B60W 2520/403; B60W 2720/403
See application file for complete search history.

(56) References Cited

U.S. PATENT DOCUMENTS

| | | | | |
|---|---|---|---|---|
| 5,332,059 | A * | 7/1994 | Shirakawa ............. | B60K 23/04 180/197 |
| 2005/0099146 | A1* | 5/2005 | Nishikawa ............... | B60K 6/44 318/63 |
| 2013/0211652 | A1* | 8/2013 | Shibata .................... | B60K 6/48 701/22 |
| 2014/0121870 | A1* | 5/2014 | Lee ........................ | B60W 20/10 701/22 |
| 2014/0257613 | A1* | 9/2014 | Tang ................... | B60L 15/2036 701/22 |

FOREIGN PATENT DOCUMENTS

| | | |
|---|---|---|
| JP | 2016-022885 A | 2/2016 |
| KR | 10-1214266 B1 | 12/2012 |
| KR | 10-1655663 B1 | 9/2016 |

\* cited by examiner

*Primary Examiner* — Edwin A Young
(74) *Attorney, Agent, or Firm* — Morgan, Lewis & Bockius LLP (57) ABSTRACT

A method for controlling an electric four wheel drive hybrid vehicle includes steps of: receiving, by a controller, a longitudinal acceleration of the hybrid vehicle corresponding to a demand torque of a driver of the hybrid vehicle; and determining, by the controller, a torque distribution ratio between a front wheel drive torque and a rear wheel drive torque of the hybrid vehicle based on a weight moving ratio of the hybrid vehicle corresponding to the received longitudinal acceleration.

8 Claims, 5 Drawing Sheets

FIG. 5

METHOD FOR CONTROLLING E-4WD HYBRID VEHICLE

CROSS-REFERENCE TO RELATED APPLICATION

This application claims the benefit of priority to Korean Patent Application No. 10-2017-0115184, filed in the Korean Intellectual Property Office on Sep. 8, 2017, the entire content of which is incorporated herein by reference.

TECHNICAL FIELD

The present disclosure relates to an environmentally-friendly vehicle, and more particularly, to a method for controlling an electric four wheel drive (E-4WD) hybrid vehicle (or an E-4WD hybrid electric vehicle).

BACKGROUND

Environmentally-friendly vehicles include a fuel cell vehicles, electric vehicles, plug-in electric vehicles, and hybrid vehicles, and typically include a motor to generate driving force.

A hybrid vehicle, which is an example of the environmentally-friendly vehicle, uses an internal combustion engine together with the power of a battery. In other words, the hybrid vehicle efficiently combines and uses the power of the internal combustion engine and the power of a motor.

The hybrid vehicle may include an engine, a motor, an engine clutch to adjust power between the engine and the motor, a transmission, a differential gear apparatus, a battery, a starter-generator that starts the engine or generates electricity by output of the engine, and wheels.

Further, the hybrid vehicle may include a hybrid control unit (HCU) for controlling the overall operation of the hybrid vehicle, an engine control unit (ECU) for controlling the operation of the engine, a motor control unit (MCU) for controlling the operation of the motor, a transmission control unit (TCU) for controlling the operation of the transmission, and a battery control unit (BCU) for controlling and managing the battery.

The battery control unit may also be referred to as a battery management system (BMS). The starter-generator may also be referred to as an integrated starter and generator (ISG) or a hybrid starter and generator (HSG).

The hybrid vehicle can be driven in a driving mode, such as an electric vehicle (EV) mode, which is an electric vehicle mode using only power of the motor, a hybrid electric vehicle (HEV) mode, which uses rotational force of the engine as main power and uses rotational force of the motor as auxiliary power, and a regenerative braking (RB) mode for collecting braking and inertial energy during driving by braking or inertia of the vehicle through electricity generation of the motor to charge the battery.

In a hybrid vehicle to which an electric four wheel drive (E-4WD) system is applied, independent driving devices are applied to front and rear wheels, respectively. In this case, an internal combustion engine (ICE) may be used as the driving device of the front wheels, and a driving motor may be used as the driving device of the rear wheels. The driving devices may be driven independently or together according to a driving environmental condition.

In a typical E-4WD hybrid vehicle, the vehicle is typically driven in a 2 wheel drive (2WD) mode in which the vehicle is driven by using only any one of front and rear wheels as a driving wheel. When driving power is insufficient, the vehicle is switched to a 4WD mode in which the vehicle is driven by using the other wheel in an idle state as the driving wheel.

In the E-4WD hybrid vehicle, the drive mode is changed depending on a driving situation so as to improve fuel efficiency. For example, when a slip occurs due to sudden starting, slippery road, sandy soil, steep hill, muddy path, or the like, and therefore, high driving power is required, the vehicle is driven in the 4WD mode. In normal high-speed driving, the vehicle is driven in the 2WD mode.

When the vehicle is driven in the 4WD mode, it is advantageous in terms of posture control or steering ability of the vehicle, climbing performance, and escape of rough road. However, in the 4WD mode, fuel efficiency is deteriorated as compared with that in the 2WD mode. When the vehicle is driven in the 2WD mode, driving torque is small, and there is no excess in terms of steering stability. However, in the case of a rainy road, snowy road, or frozen road, the road surface friction coefficient of the road decreases, and hence the friction limit of tires also decreases. Therefore, it is difficult to control the posture of the vehicle.

The above information disclosed in this Background section is only for enhancement of understanding of the background of the disclosure, and therefore it may contain information that does not form the prior art that is already known in this country to a person of ordinary skill in the art.

SUMMARY

The present disclosure has been made in an effort to provide a method for controlling an electric four wheel drive (E-4WD) hybrid vehicle (or an E-4WD hybrid electric vehicle) which is capable of performing a drive torque distribution control between a front wheel drive torque and a rear wheel drive torque of the hybrid vehicle equipped with an E-4WD system and controlling an engine operating point after the drive torque distribution control.

An exemplary embodiment of the present disclosure may provide the method for controlling the E-4WD hybrid vehicle, including: receiving, by a controller, a longitudinal acceleration of the hybrid vehicle corresponding to a demand torque of a driver of the hybrid vehicle; and determining, by the controller, a torque distribution ratio between a front wheel drive torque and a rear wheel drive torque of the hybrid vehicle based on a weight moving ratio of the hybrid vehicle corresponding to the received longitudinal acceleration.

The method for controlling the E-4WD hybrid vehicle may further include: determining, by the controller, an initial torque distribution ratio between the front wheel drive torque and the rear wheel drive torque of the hybrid vehicle corresponding to the demand torque of the driver based on a weight moving characteristic of the hybrid vehicle between a weight of front wheels and a weight of rear wheels according to acceleration or deceleration of the hybrid vehicle before the controller receives the longitudinal acceleration.

The rear wheel drive torque may be greater than the front wheel drive torque in the initial torque distribution ratio when the hybrid vehicle is accelerated, and the front wheel drive torque may be greater than the rear wheel drive torque in the initial torque distribution ratio when the hybrid vehicle is decelerated.

The method for controlling the E-4WD hybrid vehicle may further include: moving, by the controller, a value obtained by subtracting a value preventing a wheel slip of front wheels of the hybrid vehicle from occurring from the front wheel drive torque from the front wheels to rear wheels of the hybrid vehicle when the wheel slip of the front wheels is generated.

The method for controlling the E-4WD hybrid vehicle may further include: moving, by the controller, a value obtained by subtracting a value preventing a wheel slip of rear wheels of the hybrid vehicle from occurring from the rear wheel drive torque from the rear wheels to front wheels of the hybrid vehicle when the wheel slip of the rear wheels is generated.

The method for controlling the E-4WD hybrid vehicle may further include: determining, by the controller, an operating point of an engine driving front wheels of the hybrid vehicle based on a charge amount of a battery by a first driving motor driving the front wheels and a discharge amount of the battery that supplies power to a second driving motor driving rear wheels of the hybrid vehicle.

The controller may increase an output of the engine to increase a charge amount of the battery and the controller controls a torque of the second driving motor to be increased by the increased charge amount of the battery when the charge amount of the battery and the discharge amount of the battery are not equal.

A hard type hybrid system that drives the hybrid vehicle using the engine or the first driving motor may be installed at the front wheels and the second driving motor driving the hybrid vehicle may be installed at the rear wheels.

The method for controlling the E-4WD hybrid vehicle according to the exemplary embodiment may reduce a slip of driving wheels of the vehicle when the vehicle starts and accelerates to improve start performance or acceleration performance of the vehicle by appropriately distributing a drive torque to front wheels and rear wheels of the vehicle.

The exemplary embodiment may increase an energy recovery rate based on a regenerative braking ratio between the front wheels and the rear wheels (i.e., a driving torque distribution ratio between front wheel drive torque and rear wheel drive torque according to a moving ratio of the vehicle weight) when the vehicle brakes.

Further, the exemplary embodiment may improve fuel efficiency of the vehicle by determining the operating point of the engine in consideration of a charging operation of the battery.

BRIEF DESCRIPTION OF THE DRAWINGS

A brief description of the drawings will be provided to more sufficiently understand the drawings which are used in the detailed description below.

DETAILED DESCRIPTION OF THE EMBODIMENTS

In order to sufficiently understand the present disclosure and the object achieved by embodying the present disclosure, the accompanying drawings illustrating exemplary embodiments of the present disclosure and contents described in the accompanying drawings are to be referenced.

Hereinafter, the present disclosure will be described in detail by describing exemplary embodiments with reference to the accompanying drawings. In the description below, well-known configurations or functions will not be described in detail when they unnecessarily obscure the gist of the present disclosure. Throughout the accompanying drawings, the same reference numerals will be used to denote the same components.

Terms used in the present specification are only used in order to describe specific exemplary embodiments rather than limiting the present invention. Singular forms are to include plural forms unless the context clearly indicates otherwise. It will be further understood that the terms "include" or "have" used in the present specification specify the presence of features, numerals, steps, operations, components, or parts mentioned in the present specification, or a combination thereof, but do not preclude the presence or addition of one or more other features, numerals, steps, operations, components, parts, or a combination thereof.

Throughout this specification and the claims that follow, when it is described that an element is "coupled" to another element, the element may be "directly coupled" to the other element or "electrically or mechanically coupled" to the other element through a third element.

Unless defined otherwise, it is to be understood that the terms used in the present specification including technical and scientific terms have the same meanings as those that are generally understood by those skilled in the art. It must be understood that the terms defined by the dictionary are identical with the meanings within the context of the related art, and they should not be ideally or excessively formally defined unless the context clearly dictates otherwise.

A mechanical four wheel drive (4WD) vehicle includes a mechanical 4WD system that distributes a torque of the vehicle to front wheels and rear wheels of the vehicle using a mechanical actuator. There has been a mechanical 4WD system with a constant torque distribution ratio of 50:50 according to a gear ratio. The latest mechanical 4WD system may actively control a torque distribution ratio between front wheels and rear wheels. Recently, an electric four wheel drive (E-4WD) vehicle has been developed in which a mechanical actuator is eliminated and an electric motor is mounted on rear wheels of the vehicle.

The mechanical 4WD system may transmit a driving force output from an engine from a main drive wheel to a subordinate drive wheel. A conventional mechanical 4WD vehicle distributed a torque of the vehicle to front wheels and rear wheels of the vehicle according to a gear ratio. However, the latest mechanical 4WD system may control a torque distribution ratio between front wheels and rear wheels within a limited range. For example, the mechanical 4WD system may change the torque distribution ratio to 80:20 in a certain situation after maintaining the torque distribution ratio as 40:60.

Figure 1:
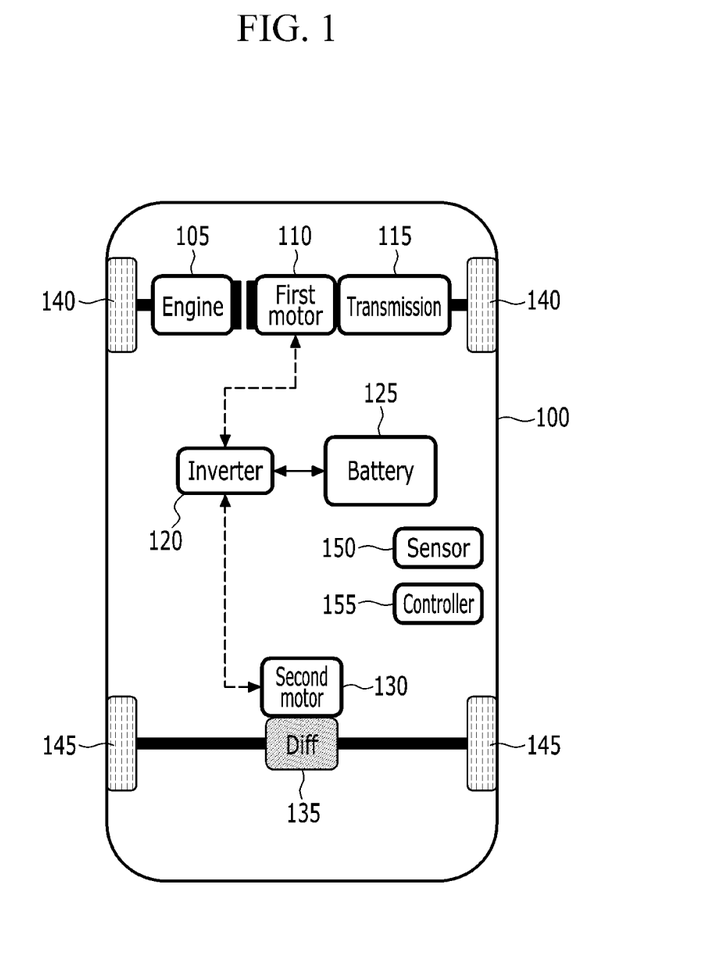
FIG. 1 is a view for explaining an electric four wheel drive (E-4WD) to which a method for controlling the E-4WD hybrid vehicle according to an exemplary embodiment of the present disclosure is applied.
Figure 2:
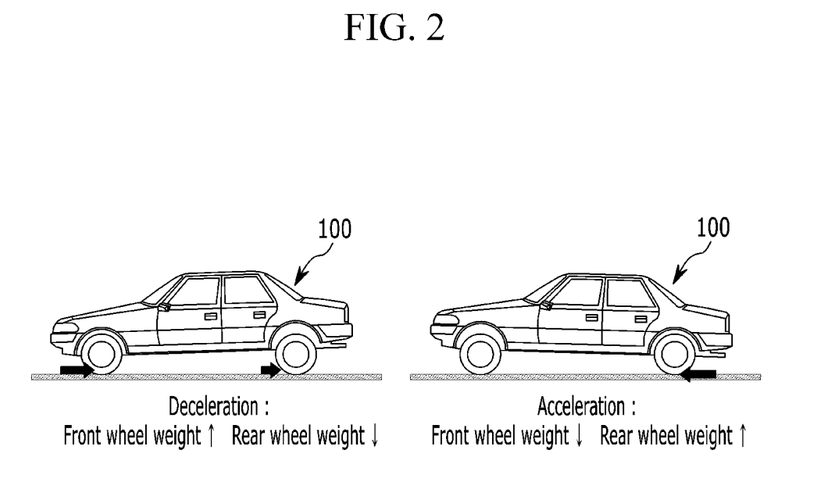
FIG. 2 is a view for explaining a weight movement of the vehicle shown in FIG. 1 when the vehicle accelerates or decelerates.
Figure 3:
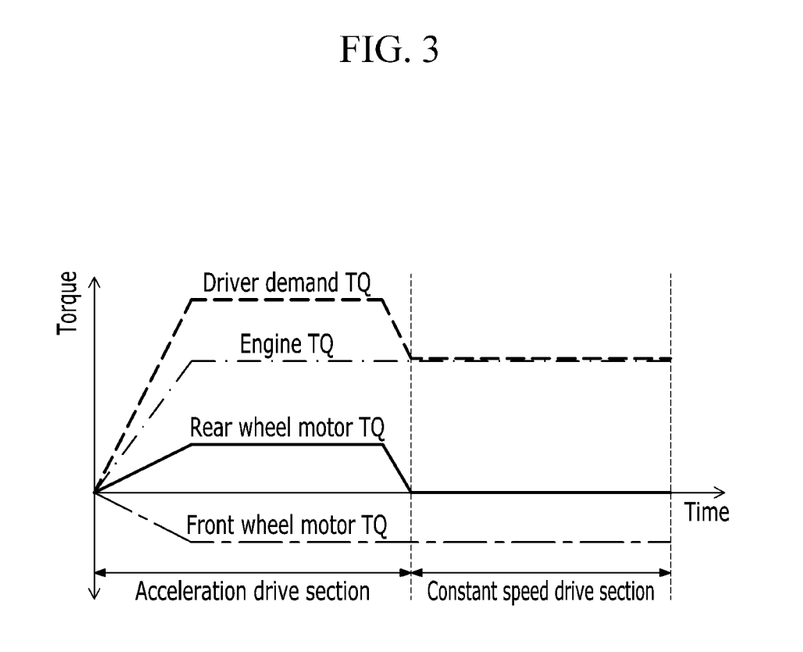
FIG. 3 is a graph illustrating an exemplary embodiment of an engine operation point control of the vehicle shown in FIG. 1.
Figure 4:
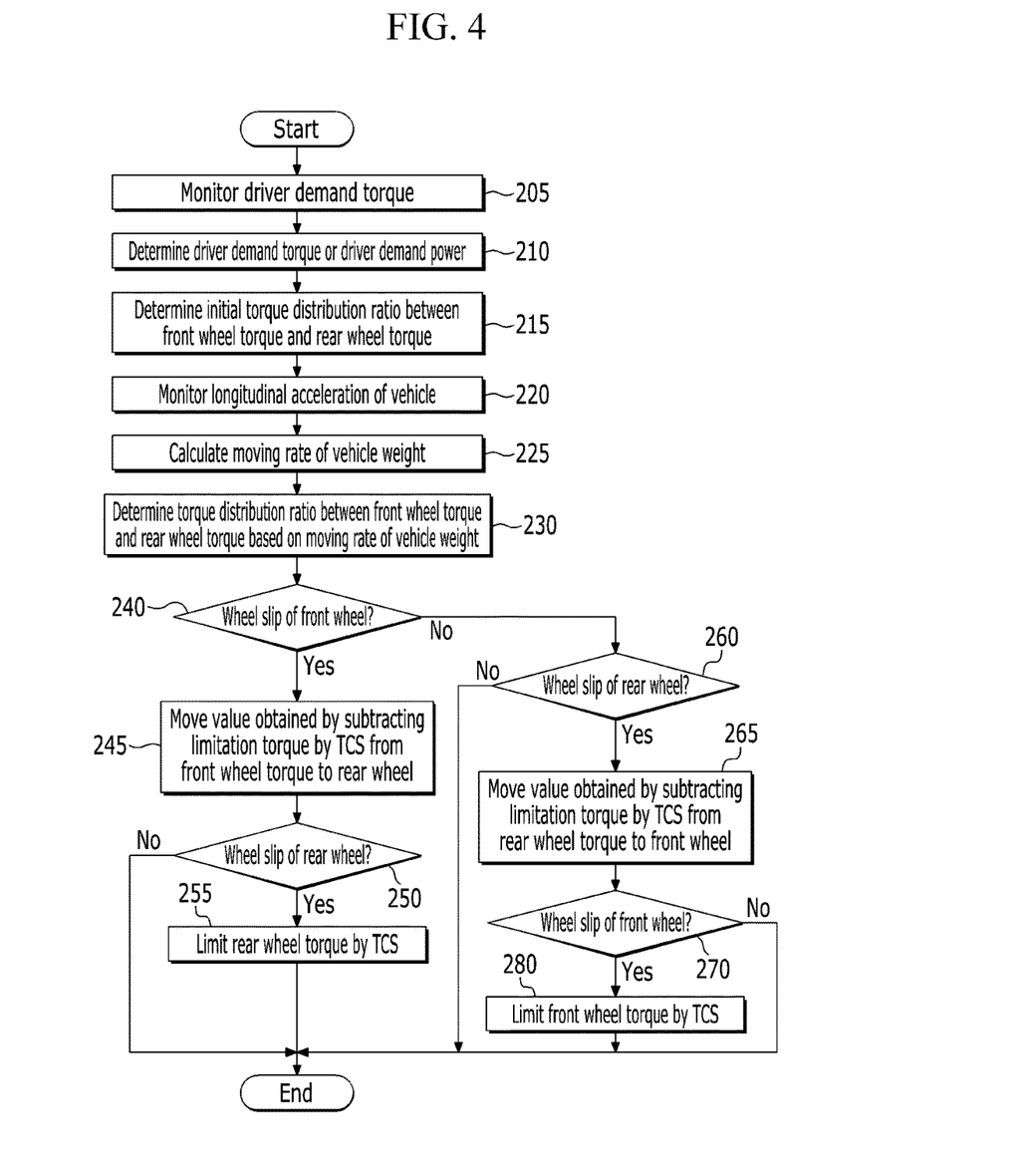
FIG. 4 is a flowchart illustrating the method for controlling the E-4WD hybrid vehicle according to the exemplary embodiment of the present disclosure.

FIG. 1 is a view explaining an electric four wheel drive (E-4WD) to which a method for controlling the E-4WD hybrid vehicle according to an exemplary embodiment of the present disclosure is applied. FIG. 2 is a view for explaining a weight movement of the vehicle shown in FIG. 1 when the vehicle accelerates or decelerates. FIG. 3 is a graph illustrating an exemplary embodiment of an engine operation point control of the vehicle shown in FIG. 1. FIG. 4 is a flowchart illustrating the method for controlling the E-4WD hybrid vehicle according to the exemplary embodiment.

Referring to FIGS. 1 to 4, in a monitoring step 205, a controller 155 of the E-4WD hybrid vehicle 100 shown in FIG. 1 may control a sensor 150 to monitor (or detect) a demand torque of a driver of the hybrid vehicle. The sensor 150 may include an acceleration pedal position sensor APS for detecting an operation of the driver's accelerator pedal or a position value of the accelerator pedal or a brake pedal position sensor BPS for detecting an operation of the driver's brake pedal or a position value of the brake pedal.

Unlike a mechanical 4WD system, the E-4WD hybrid vehicle 100 that is an E-4WD system may be a system that implements a function of a 4WD system by mounting an electric motor 130 to non-driving wheels 145 of a 2 wheel drive (2WD) vehicle. A method for implementing the E-4WD system 100 may include a method of generating a driving force of an electric motor using only electric energy generated by a generator mounted on an engine without separately installing a battery for driving the electric motor, a method of providing a power source for a hybrid electric vehicle (HEV) mode to an electric motor mounted on a vehicle, or a method of mounting a motor for an E-4WD function in a hard-type hybrid vehicle.

The E-4WD hybrid vehicle 100 may be driven in an electric vehicle mode (EV) mode or a hybrid electric vehicle mode (HEV) mode. The EV mode may mean a driving mode using only the electric motor 110 or 130. The HEV mode may mean a driving mode in which an output of an engine 105 and an output of the electric motor 110 are used. In the HEV mode, when a demand torque (or a demand power) of the driver is not large, the engine 105 may be driven at the optimum efficiency operating point, and the motor 110 may output a torque between a torque at the engine optimum efficiency operating point and the driver's demand torque. In the HEV mode, the motor 110 may charge a battery 125 using an inverter 120.

The E-4WD hybrid vehicle 100 includes the engine 105, the first driving motor 110, a transmission 115, the inverter 120, the battery 125, the second driving motor 130, a differential gear device 135, front wheels 140, rear wheels 145, the sensor 150, and the controller 155.

For example, the controller 155 may be one or more microprocessors operated by a program or hardware including the microprocessor. The program may include a series of commands for executing the method for controlling the E-4WD hybrid vehicle according to the exemplary embodiment of the present disclosure. The commands may be stored in a memory. The controller 155 may control overall operation of the hybrid vehicle 100.

The controller 155 may include a hybrid control unit (HCU), an engine control unit (ECU) for controlling an operation of the engine 105, and a motor control unit (MCU) for controlling operations of the first driving motor 110 and the second driving motor 130. The HCU may be the highest controller, may synthetically control the ECU and the MCU connected to a network such as a controller area network (CAN) which is a vehicle network, and may control overall operation of the hybrid vehicle 100.

The first driving motor 110 may be operated by a three-phase AC voltage that is output from the inverter 120 to generate a torque. The motor 330 may be operated as a generator during coasting drive or regenerative braking to supply a voltage (or regenerative energy) to the battery 125. The first driving motor 110 may be operated by the engine 105 as a generator.

The second driving motor 130 may be operated by a three-phase AC voltage that is output from the inverter 120 to generate a torque. The motor 330 may be operated as a generator during coasting drive or regenerative braking to supply a voltage (or regenerative energy) to the battery 125.

The inverter 120 may convert a direct current (DC) voltage that is supplied from the battery 125 into a three-phase alternating current (AC) voltage to drive the first driving motor 110 and the second driving motor 130.

The battery 125 may include a plurality of unit cells. A high voltage for providing a driving voltage (e.g., 350-450 V DC) to the first driving motor 110 and the second driving motor 130 may be stored in the battery 125.

A transmission mounted electric device (TMED) system including the engine 105, the transmission 115 having a first driving motor 110, and an engine clutch for connecting or disconnecting the engine and the first driving motor may be installed at the front wheels 140. In another exemplary embodiment of the present disclosure, a hard type hybrid system that drives a vehicle using an engine or a driving motor may be installed at the front wheels 140.

The second driving motor 130 for driving the E-4WD hybrid vehicle 100 may be installed at the rear wheels 145. The second driving motor 130 may be connected to the rear wheels 145 via the differential gear device 135.

In another exemplary embodiment of the present disclosure, the second driving motor 130 may be installed at the front wheels 140, and the hard type hybrid system may be installed at the rear wheels 145.

According to a determination step 210, the controller 155 may determine the driver's demand torque (TQ) or the driver's demand power of the E-4WD hybrid vehicle 100 based on the detected sensor signal.

According to a distribution step 215, the controller 155 may determine an initial torque distribution ratio between a front wheel drive torque and a rear wheel drive torque of the E-4WD hybrid vehicle 100 corresponding to the determined driver's demand torque. The front wheel drive torque may be distributed to the front wheels 140 and the rear wheel drive torque may be distributed to the rear wheels 145. In more detail, the initial drive distribution ratio in a situation of a start or a deceleration of the vehicle may be set based on a weight moving characteristic of the vehicle between a weight of the front wheels 140 and a weight of the rear wheels 145 according to acceleration or deceleration of the E-4WD hybrid vehicle 100 shown in FIG. 2. The weight moving characteristic may be a predetermined rule. That is, the controller 155 may use feedforward control based on a map table (e.g., memory) generated by a test.

For example, the torque distribution ratio at the start of the vehicle may be a distribution ratio (e.g., 40:60) in which a ratio of the drive torque of the rear wheels 145 becomes high. For example, the torque distribution ratio at the time of deceleration of the vehicle may be a distribution ratio (e.g., 60:40) in which a ratio of the drive torque of the front wheels 140 becomes high. Specifically, the rear wheel drive torque may be greater than the front wheel drive torque and the E-4WD hybrid vehicle 100 in the initial torque distribution ratio when the E-4WD hybrid vehicle 100 is accelerated, and the front wheel drive torque may be greater than the rear wheel drive torque in the initial torque distribution ratio when the hybrid vehicle 100 is decelerated.

According to a monitoring step 220, the controller 155 may control the sensor 150 to monitor (or detect) a longitudinal acceleration of the E-4WD hybrid vehicle 100. The sensor 150 may include an acceleration sensor or a longitudinal acceleration sensor included in a traction control system (TCS) or an electronic stability program (ESP) which is a vehicle posture control system of the E-4WD hybrid vehicle 100. The controller 155 may be connected via the CAN to the TCS or the ESP. The controller 155 may receive the longitudinal acceleration of the E-4WD hybrid vehicle 100 corresponding to the driver's demand torque from the sensor 150.

According to a calculation step 225, the controller 155 may calculate a moving ratio of the weight of the E-4WD hybrid vehicle 100 of FIG. 2 due to the longitudinal acceleration.

A front wheel weight distribution ratio among the moving ratio may be given by the following equation.

$$\frac{W_{GVW\_Rr} - \frac{Ax}{g} * \frac{CG\_height}{L} * W_{GVW}}{W_{GVW}}$$

In the equation, $W_{GVW}$ may be a gross vehicle weight of the E-4WD hybrid vehicle 100, $W_{GVW\_Rr}$ may be the weight of the rear wheels 145 in $W_{GVW}$, g may be a gravitational acceleration, Ax may be the longitudinal acceleration, CG_height may be a center of gravity height of the E-4WD hybrid vehicle 100, and L may be a wheel base of the E-4WD hybrid vehicle 100 and may be a distance between a front wheel axis and a rear wheel axis of the vehicle. The rear wheel weight may be detected by a weight sensor included in the sensor 150.

The front wheel weight distribution ratio may have a value between 0 and 1, and the front wheels 140 may bear the weight of the E-4WD hybrid vehicle 100 by 100% when the front wheel weight distribution ratio is 1.

A rear wheel weight distribution ratio among the moving ratio may be given by the following equation.

$$\frac{W_{GVW\_Rr} + \frac{Ax}{g} * \frac{CG\_height}{L} * W_{GVW}}{W_{GVW}}$$

In the equation, $W_{GVW}$ may be the gross vehicle weight of the E-4WD hybrid vehicle 100, $W_{GVW\_Rr}$ may be the weight of the rear wheels 145 in $W_{GVW}$, g may be the gravitational acceleration, Ax may be the longitudinal acceleration, CG_height may be the center of gravity height of the E-4WD hybrid vehicle 100, and L may be the wheel base of the E-4WD hybrid vehicle 100.

The rear wheel weight distribution ratio may have a value between 0 and 1, and the rear wheels 145 may bear the weight of the E-4WD hybrid vehicle 100 by 100% when the rear wheel weight distribution ratio is 1.

According to a determination step 230, the controller 155 may determine a torque distribution ratio between the front wheel drive torque and the rear wheel drive torque of the E-4WD hybrid vehicle 100 based on the weight moving ratio corresponding to the received longitudinal acceleration.

The front wheel drive torque may be given by the following equation.

The front wheel drive torque=the driver's demand torque of the E-4WD hybrid vehicle 100×the front wheel weight distribution ratio×α.

In the above equation, the α may be a tuning factor and may be omitted.

The rear wheel drive torque may be given by the following equation.

The rear wheel drive torque=the driver's demand torque of the E-4WD hybrid vehicle 100×the rear wheel weight distribution ratio×(1−α).

The front wheel drive torque and the rear wheel drive torque may be calculated by a feedback control operation of the controller 155.

The reason why the torque distribution ratio changes according to the weight movement of the E-4WD hybrid vehicle 100 may be because a static friction force (μMg) of the E-4WD hybrid vehicle is changed according to the weight movement of the vehicle generated when the vehicle decelerates or accelerates as shown in FIG. 2. Referring to FIG. 2, the weight of the rear wheels 145 may be large when the vehicle 100 accelerates and the weight of the front wheels 140 may be large when the vehicle decelerates. For example, the weight may move to the rear wheels 145 and the static friction force of the rear wheels increases when the vehicle 100 accelerates, and thus the rear wheels may output a high driving torque. Therefore, the E-4WD hybrid vehicle 100 in which the front wheel drive torque and the rear wheel drive torque are distributed may be driven by a higher driving force than a front wheel drive vehicle. In addition, since a slip rate of the wheels is reduced when the drive torques is distributed according to the weight movement of the vehicle 100, driving efficiency of the vehicle 100 may be improved.

According to a determination step 240, the controller 155 may determine whether a wheel slip of the front wheels 140 of the E-4WD hybrid vehicle 100 occurs after the torque distribution ratio is determined. The wheel slip may be detected by a slip detection sensor included in the sensor 150 or the traction control system (TCS) included in the E-4WD hybrid vehicle 100 and may be provided to the controller 155.

The TCS, which is a system for controlling an excessive driving torque of the vehicle 100 that occurs when the vehicle is started or accelerated on a slippery road such as a snowy road or in rain so that a tire (or a wheel) does not slip, may operate when the tire slips, when there is a difference between number of revolutions of a right tire and number of revolutions of a left tire, or when the tire is punctured. The TCS may prevent slip of the wheels 140 and 145, and may output a demand torque that limits the drive torque of the vehicle 100 to request a torque reduction to the controller 155 when a tire of the vehicle slips.

When the wheel slip of the front wheels 140 is generated, the method for controlling the E-4WD hybrid vehicle which is a process may proceed to a moving step 245. The process may proceed to a determination step 260 when the wheel slip of the front wheels is not generated.

According to the moving step 245, the controller 155 may move a value obtained by subtracting a limitation torque by the TCS from the front wheel drive torque from the front wheels 140 to the rear wheels 145. The limitation torque may mean a value for preventing the wheel slip of the front wheels from occurring. In more detail, the controller 155 may redistribute the drive torque to the front wheels 140 and the rear wheels 145 to prevent the wheel slip of the vehicle 100 due to an excessive front wheel drive torque.

According to a determination step 250, after the moving step 245, the controller 155 may determine whether a wheel slip of the rear wheel 145 of the E-4WD hybrid vehicle 100 occurs. The wheel slip may be detected by the slip detection sensor or the TCS and may be provided to the controller 155.

According to an output step 255, when the wheel slip of the rear wheels 145 is generated, the controller 155 may control the TCS to limit the drive torque of the rear wheels 145.

According to the determination step 260, the controller 155 may determine whether a wheel slip of the rear wheels 145 of the E-4WD hybrid vehicle 100 occurs.

According to a moving step 265, when the wheel slip of the rear wheel 145 is generated, the controller 155 may move a value obtained by subtracting a limitation torque by the TCS from the rear wheel drive torque from the rear wheels 145 to the front wheels 140. The limitation torque may mean a value for preventing the wheel slip of the rear wheels from occurring.

According to a determination step 270, after the moving step 265, the controller 155 may determine whether a wheel slip of the front wheel 140 of the E-4WD hybrid vehicle 100 occurs. The wheel slip may be detected by the slip detection sensor or the TCS and may be provided to the controller 155.

According to an output step 280, when the wheel slip of the front wheels 140 occurs, the controller 155 may control the TCS to limit the drive torque of the front wheels 140.

Figure 5:
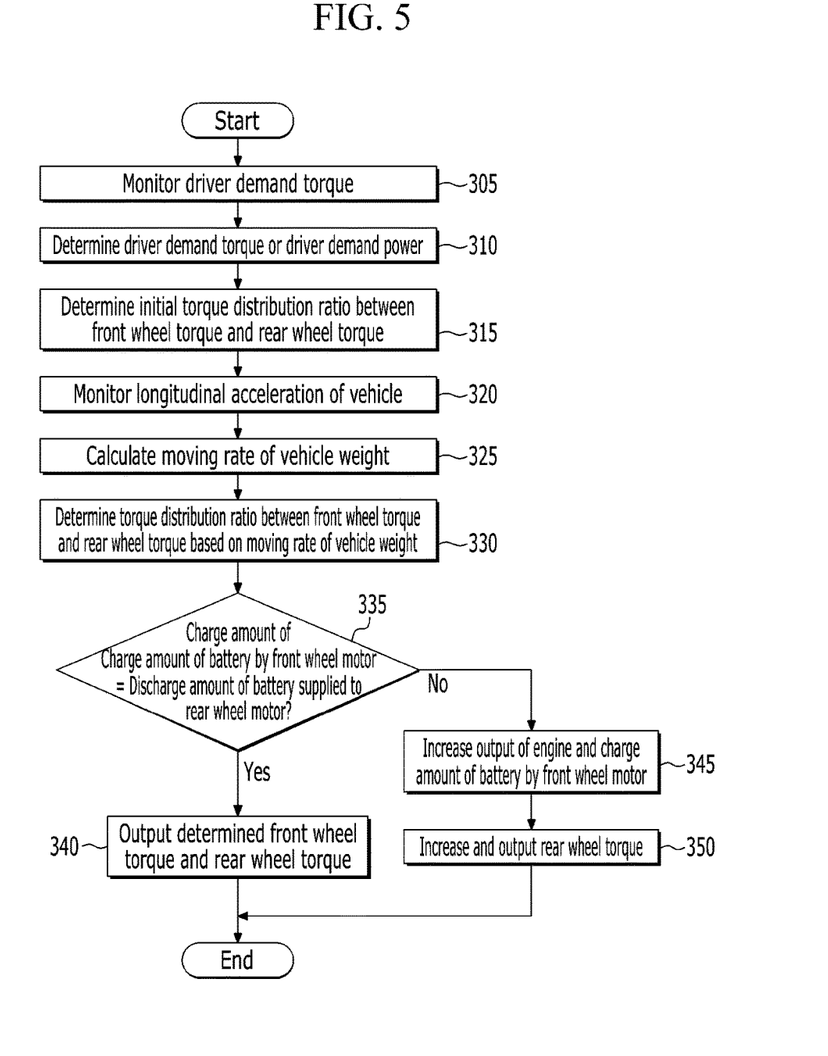
FIG. 5 is a flowchart illustrating a method for controlling the E-4WD hybrid vehicle according to another exemplary embodiment of the present disclosure.

FIG. 5 is a flowchart illustrating a method for controlling the E-4WD hybrid vehicle according to another exemplary embodiment of the present disclosure.

Referring to FIGS. 1 to 5, in a monitoring step 305, the controller 155 of the E-4WD hybrid vehicle 100 may control the sensor 150 to monitor (or detect) the demand torque of the driver of the hybrid vehicle.

According to a determination step 310, the controller 155 may determine the driver's demand torque or the driver's demand power of the E-4WD hybrid vehicle 100 based on the detected sensor signal.

According to a distribution step 315, the controller 155 may determine the initial torque distribution ratio between the front wheel drive torque and the rear wheel drive torque of the E-4WD hybrid vehicle 100 corresponding to the driver's demand torque. The front wheel drive torque may be distributed to the front wheels 140 and the rear wheel drive torque may be distributed to the rear wheels 145. The initial drive distribution ratio in the situation of a start or a deceleration of the vehicle may be set based on the weight moving characteristic of the vehicle between the weight of the front wheels 140 and the weight of the rear wheels 145 according to acceleration or deceleration of the E-4WD hybrid vehicle 100 shown in FIG. 2. In other words, the controller 155 may use feedforward control based on the map table (e.g., memory) generated by the test.

The rear wheel drive torque may be greater than the front wheel drive torque in the initial torque distribution ratio when the E-4WD hybrid vehicle 100 is accelerated, and the front wheel drive torque may be greater than the rear wheel drive torque in the initial torque distribution ratio when the hybrid vehicle 100 is decelerated.

According to a monitoring step 320, the controller 155 may control the sensor 150 to monitor (or detect) a longitudinal acceleration of the E-4WD hybrid vehicle 100. The controller 155 may receive the longitudinal acceleration of the E-4WD hybrid vehicle 100 corresponding to the driver's demand torque from the sensor 150.

According to the calculation step 325, the controller 155 may calculate a moving ratio of the weight of the E-4WD hybrid vehicle 100 of FIG. 2 due to the longitudinal acceleration.

A front wheel weight distribution ratio among the moving ratio may be given by the following equation.

$$\frac{W_{GVW\_Rr} - \frac{Ax}{g} * \frac{CG\_height}{L} * W_{GVW}}{W_{GVW}}$$

A rear wheel weight distribution ratio among the moving ratio may be given by the following equation.

$$\frac{W_{GVW\_Rr} + \frac{Ax}{g} * \frac{CG\_height}{L} * W_{GVW}}{W_{GVW}}$$

According to a determination step 330, the controller 155 may determine a torque distribution ratio between the front wheel drive torque and the rear wheel drive torque of the E-4WD hybrid vehicle 100 based on the weight moving ratio corresponding to the received longitudinal acceleration.

The front wheel drive torque may be given by the following equation.

The front wheel drive torque=the driver's demand torque of the E-4WD hybrid vehicle 100×the front wheel weight distribution ratio×α.

In the above equation, the α may be a tuning factor and may be omitted.

The rear wheel drive torque may be given by the following equation.

The rear wheel drive torque=the driver's demand torque of the E-4WD hybrid vehicle 100×the rear wheel weight distribution ratio×(1−α).

The front wheel drive torque and the rear wheel drive torque may be calculated by a feedback control operation of the controller 155.

According to a determination step 335, after the torque distribution ratio is determined, the controller 155 may determine whether a charge amount of the battery 125 generated by the first driving motor 110 driving the front wheels 140 is equal to a discharge amount of the battery that supplies power to the second driving motor 130 driving the rear wheels 145 as shown in FIG. 3. An excessive charging operation of the battery 125 may be prevented by the determination step 335.

When the charge amount of the battery 125 is equal to the discharge amount of the battery, the method for controlling the E-4WD hybrid vehicle which is a process may proceed to an output step 340. The process may proceed to an increase step 345 when the charge amount of the battery 125 and the discharge amount of the battery 125 are not equal.

According to the output step 340, the controller 155 may control the front wheels 140 and the rear wheels 145 to output the determined front wheel drive torque and rear wheel drive torque.

According to the increase step 345, the controller 155 may increase the output of the engine 105 to control a charge amount of the battery to increase so as to equalize the charge amount of the battery and the discharge amount of the battery. In more detail, the controller 155 may determine an operating point of the engine 105 driving the front wheels 140 of the E-4WD hybrid vehicle 100 based on the charge amount of the battery 125 and the discharge amount of the battery.

According to an output step 350, the controller 155 may control a torque of the second driving motor 130 to be increased by the increased charge amount of the battery, so that the increased rear wheel drive torque is output to the rear wheels 145 and the determined front wheel drive torque is output to the front wheels 140.

The components, "~ unit", block, or module which are used in the present exemplary embodiment may be implemented in software such as a task, a class, a subroutine, a process, an object, an execution thread, or a program which is performed in a predetermined region in the memory, or hardware such as a field programmable gate array (FPGA) or an application-specific integrated circuit (ASIC), and may be performed with a combination of the software and the hardware. The components, '~ part', or the like may be embedded in a computer-readable storage medium, and some part thereof may be dispersedly distributed in a plurality of computers.

As set forth above, exemplary embodiments have been disclosed in the accompanying drawings and the specification. Herein, specific terms have been used, but are just used for the purpose of describing the present disclosure and are not used for qualifying the meaning or limiting the scope of the present invention, which is disclosed in the appended claims. Therefore, it will be understood by those skilled in the art that various modifications and equivalent exemplary embodiments are possible from the present invention. Accordingly, the actual technical protection scope of the present invention must be determined by the spirit of the appended claims.

What is claimed is:

1. A method for controlling an electric four wheel drive hybrid vehicle, comprising steps of:
    receiving, by a controller, a longitudinal acceleration of the hybrid vehicle corresponding to a demand torque of a driver of the hybrid vehicle;
    determining, by the controller, a torque distribution ratio between a front wheel drive torque and a rear wheel drive torque of the hybrid vehicle based on a weight moving ratio of the hybrid vehicle corresponding to the received longitudinal acceleration; and
    operating, by the controller, front wheels and rear wheels of the hybrid vehicle based on the determined torque distribution ratio.

2. The method of claim 1, further comprising:
    determining, by the controller, an initial torque distribution ratio between the front wheel drive torque and the rear wheel drive torque of the hybrid vehicle corresponding to the demand torque of the driver based on a weight moving characteristic of the hybrid vehicle between a weight of the front wheels and a weight of the rear wheels according to acceleration or deceleration of the hybrid vehicle before the controller receives the longitudinal acceleration.

3. The method of claim 2, wherein the rear wheel drive torque is greater than the front wheel drive torque in the initial torque distribution ratio when the hybrid vehicle is accelerated, and the front wheel drive torque is greater than the rear wheel drive torque in the initial torque distribution ratio when the hybrid vehicle is decelerated.

4. The method of claim 1, further comprising:
    moving, by the controller, a value obtained by subtracting a value preventing a wheel slip of the front wheels of the hybrid vehicle from occurring from the front wheel drive torque from the front wheels to the rear wheels of the hybrid vehicle when the wheel slip of the front wheels is generated.

5. The method of claim 1, further comprising:
    moving, by the controller, a value obtained by subtracting a value preventing a wheel slip of the rear wheels of the hybrid vehicle from occurring from the rear wheel drive torque from the rear wheels to the front wheels of the hybrid vehicle when the wheel slip of the rear wheels is generated.

6. The method of claim 1, further comprising:
    determining, by the controller, an operating point of an engine driving the front wheels of the hybrid vehicle based on a charge amount of a battery by a first driving motor driving the front wheels and a discharge amount of the battery that supplies power to a second driving motor driving the rear wheels of the hybrid vehicle.

7. The method of claim 6, wherein the controller increases an output of the engine to increase a charge amount of the battery and the controller controls a torque of the second driving motor to be increased by the increased charge amount of the battery when the charge amount of the battery and the discharge amount of the battery are not equal.

8. The method of claim 6, wherein a hard type hybrid system that drives the hybrid vehicle using the engine or the first driving motor is installed at the front wheels and the second driving motor driving the hybrid vehicle is installed at the rear wheels.

\* \* \* \* \*